United States Patent [19]
Frost et al.

[11] Patent Number: 5,776,417
[45] Date of Patent: Jul. 7, 1998

[54] EMISSIONS CONTROL

[75] Inventors: Johnathan C. Frost, Henley; Stephen C. Bennett, Reading; David S. Lafyatis, Reading; Andrew P. Walker, Reading, all of United Kingdom

[73] Assignee: Johnson Matthey Public Limited Company, London, United Kingdom

[21] Appl. No.: 658,808

[22] Filed: Jun. 6, 1996

[30] Foreign Application Priority Data

Jun. 6, 1995 [GB] United Kingdom ............... 9511421

[51] Int. Cl.$^6$ .................. B01D 50/00; B01D 53/34
[52] U.S. Cl. ............... 422/171; 422/169; 422/170; 422/177; 422/178; 60/297; 60/320; 55/DIG. 30
[58] Field of Search .................. 422/169–171, 422/177–178, 180, 211, 217, 222; 60/274, 297, 299, 301, 311, 320; 55/DIG. 30, DIG. 10; 423/213.5, 213.2, 213.7, 212 R, 212 C

[56] References Cited

U.S. PATENT DOCUMENTS

| | | | |
|---|---|---|---|
| 3,699,683 | 10/1972 | Tourtellotte et al. | 423/213.5 |
| 4,395,876 | 8/1983 | Marsee et al. | 60/284 |
| 4,919,903 | 4/1990 | Gandhi et al. | 423/213.5 |
| 5,078,979 | 1/1992 | Dunne | 423/213.5 |
| 5,125,231 | 6/1992 | Patil et al. | 422/171 |
| 5,332,554 | 7/1994 | Yasahi et al. | 422/180 |
| 5,397,550 | 3/1995 | Marino, Jr. | 422/178 |
| 5,417,947 | 5/1995 | Hertl et al. | 423/213.2 |

*Primary Examiner*—Hien Tran
*Attorney, Agent, or Firm*—Pillsbury Madison & Sutro LLP Cushman Darby & Cushman Intellectual Property Group

[57] ABSTRACT

Substantial improvements in the control of pollutants from internal combustion engines may be obtained by pre-drying a catalyst/hydrocarbon trap system and preferably incorporating a water trap in a catalyst/hydrocarbon trap system. A pre-drying system dries the water trap, HC trap and catalyst, eg upon engine switch-off.

18 Claims, 9 Drawing Sheets

EMISSIONS CONTROL

This invention concerns improvements in emission control, especially for vehicles or stationary engines, which may be powered by gasoline, diesel, natural gas or other hydrocarbon or oxygenate fuels. The invention will be described hereinafter with particular reference to gasoline-fuelled engines, but is not to be considered to be limited thereto.

BACKGROUND OF THE INVENTION

As emissions from gasoline engines become more regulated, attention has been concentrated on the start-up phase, when emissions of hydrocarbons ("HCs") tend to be highest, because the catalyst has not reached a temperature giving a reasonable conversion efficiency ("light-off"). The "light-off" temperature is considered to be the temperature at which 50% of the emissions are converted. A variety of methods have been proposed to improve cold start emission control, including electrical heating of the catalyst or gas entering the catalyst, and trapping hydrocarbons until the catalyst reaches light-off temperature, whereupon the hydrocarbons are released for oxidation. For example, U.S. Pat. No. 5,078,979 proposes a combination of catalyst and HC trap, wherein the trap may be a zeolite selected to have a greater absorption capacity for HCs than for water.

U.S. Pat. No. 5,417,947 describes an emission control system in which olefins are particularly targeted, because of their propensity to form ozone in the atmosphere. This patent teaches a system to remove olefins includes a hydrophilic material to remove at least some of the water from the exhaust gas, and a hydrocarbon trap downstream thereof, because water inhibits the adsorption capacity of some zeolites for olefins.

An earlier proposal in this general field is found in DE 2129209, in which an exhaust gas from an engine operated at a rich fuel-air ratio to reduce NOx formation is cooled, hydrocarbons are adsorbed and then CO is oxidised over a catalyst such as "Hopcalite". The adsorber is regenerated and the hydrocarbons are recycled to the engine carburettor. This concept runs counter to modern engine and emission control design, and is not believed to offer a practical way of meeting current emissions regulations.

SUMMARY OF THE INVENTION

We have confirmed that the presence of water adversely affects the ability of suitable HC trap materials to adsorb HCs, with the consequence that the overall performance of the system in dealing with emissions during cold start, or before light-off, is reduced. We have discovered that pre-drying the HC trap and the catalyst system itself prior to cold start, leads to substantial improvements in the overall performance of the system. This may be achieved by pre-drying means, such as a pump to provide a stream of air (eg at 350–500° C.) after switch-off of the engine, which air may be heated by residual heat from the catalyst or engine.

Preferably, the performance of the dried HC trap and/or catalyst system is further improved by incorporating water trapping. We have now discovered that a water trap positioned upstream of a HC trap and catalyst system can act to provide a practical engine emission control system with close to substantially theoretical emission control efficiency.

DETAILED DESCRIPTION OF INVENTION

A suitable catalyst is a highly loaded Pd- or Pt-based catalyst although any catalyst material with low light-off characteristics may used. It may alone, or in combination with one or more other catalyst components, oxidise CO and HCs and reduce NOx. The actual catalyst used is not believed to be critical to the present invention.

A suitable HC trap material is an ion-exchanged zeolite, such as Co/ZSM-5 or Pt/ZSM-5, but other HC traps including impregnated zeolites and non-metaltised zeolites, may be used. Preferred HC trap materials are those which also are effective to have a trapping or delaying effect on NO, and metallised zeolites are especially suitable. The material known as silicalite, or very high silica/alumina ratio aluminosilicates, are cost-effective HC traps.

A suitable water trap is a water trapping molecular sieve, such as a zeolite 5A, although zeolite 3A, 4A or 13X may be used. Most zeolites preferentially adsorb water in comparison to HCs, but in general the smaller pore size zeolites are preferred. Other high surface area materials, including particularly silicas and aluminas, may exhibit better properties than zeolites after hydrothermal ageing in use. The water trap and the HC trap may be of the same material.

We have found that both NO and hydrocarbon species can severely inhibit the activity of low light-off CO oxidising catalysts. HC and NO are, of course, natural components of exhaust gas. The present invention further provides a HC trap and catalyst combination wherein the catalyst comprises a low light off temperature CO oxidation catalyst and the combination is so arranged that said catalyst is not exposed to sufficient concentration of HC, and preferably, is not exposed to sufficient concentrations of NO, that CO oxidation on said catalyst is substantially inhibited during light-off. Naturally, the presence of an upstream water trap will also lower the exposure of said catalyst to water; this may also lead to a benefit at light-off. Most preferably, the CO concentration of the exhaust gas is sufficiently high for the oxidation reaction exotherm heat of reaction to raise the catalyst temperature sufficiently high to oxidise hydrocarbons (HCs) as the said HCs desorb from that HC trap. It may be preferable to modify the engine operating regime to provide for higher than normal CO emissions during cold start, in order to maximise the CO oxidation exotherm. This may be achieved by modifying the electronic engine management system, eg by revising the memory and/or control circuitry on the engine management "chip", which may be carried out by those skilled in the art.

A particularly suitable configuration for a preferred embodiment is a water trap followed by a HC trap and a catalyst, optionally within a single "can" or exhaust system box, or there may be a mixed or layered trap and catalyst, for example a portion of the catalyst is coated with a porous material that permits CO and oxygen to reach the catalyst surface, but prevents HC reaching the catalyst surface. A simpler arrangement is where trap material is admixed with the catalyst. Preferably, however, the water trap and HC trap are deposited on separate monolith supports, as described in more detail below.

The invention further provides an exhaust gas emission control system comprising a water trap, a HC trap, a catalyst which is a low temperature light -off CO oxidation catalyst, a catalyst which is a low temperature light-off HC oxidation catalyst, and means for pre-drying the system, so arranged that the exotherm from CO oxidation is effective to raise the temperature of the HC oxidation catalyst. The CO and HC catalysts may be the same catalyst formulation, or different components may provide the two different duties. For example, the low temperature light-off CO oxidation catalyst may be coated with a porous layer, which permits CO and $O_2$ to reach the catalyst surface, but prevents HC from reaching the surface.

The effectiveness of the total emission system of the above preferred embodiment during cold start is substantially improved by pre-drying the system before the cold start. This may be achieved by pre-drying means, such as a pump to provide a stream of air after switch-off of the engine. Optimally, the residual engine or exhaust heat, or heat from the catalyst, may be used.

In a particularly preferred embodiment, the pre-drying means incorporates a secondary water trap to dry the air from the pump for the duty of drying the main water trap. The secondary water trap may be dried or regenerated during engine operation by utilising waste heat, eg from the engine, and a relatively low flow of air from the pump. It may be desirable to incorporate a water trap positioned downstream of the catalyst, to prevent moist ambient air travelling back up the exhaust system to reduce the effectiveness of the catalyst and/or HC trap.

The water trap, HC trap and catalyst, whether as discrete units or with one or more layered components, may be manufactured according to generally known methods in the catalytic convertor art. Preferably, each component, whether as a discrete unit or a layered unit, is in the form of a deposit on the surfaces of an open-celled honeycomb support, which may be metal or a ceramic such as cardierite. Such supports are commercially available or may be manufactured according to known methods, and demonstrate low resistance to flow of exhaust gases.

It may be desirable, according to the present invention, to provide pre-drying means such as a stream of electrically heated air for drying the HC trap and/or catalyst in the event of the emission control system having stood for several days, or generally under conditions under which the trap and/or catalyst have been exposed to ambient air and have adsorbed moisture.

We believe that the present invention will demonstrate more considerable benefits in the case of used or "aged" catalysts than with brand new catalysts.

BRIEF DESCRIPTION OF THE DRAWINGS

Further details of the present invention, and an appreciation of its various aspects may be seen from the accompanying drawings and test results.

TEST 1

Figure 1:
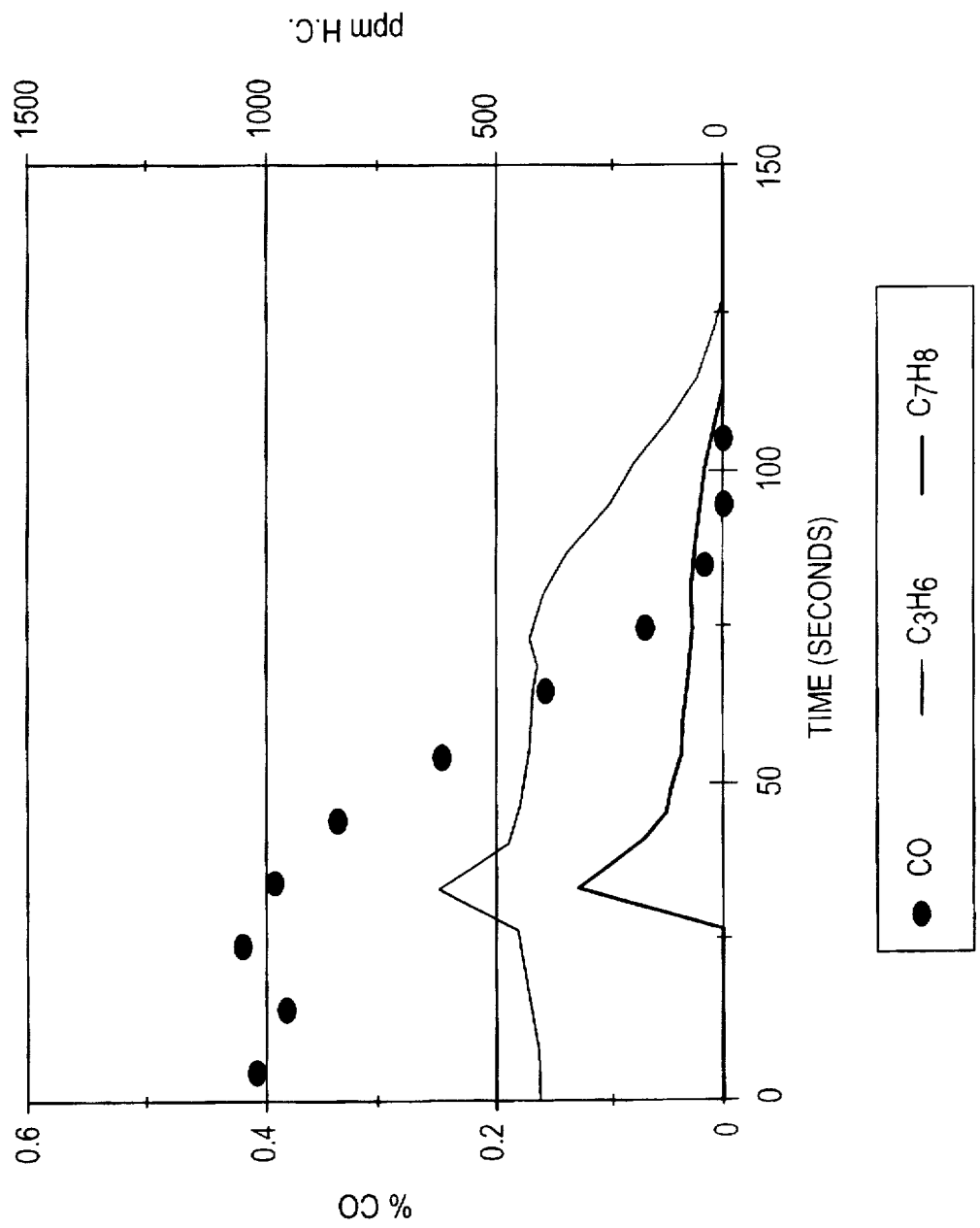
FIGS. 1 to 5 are plots showing conversions of CO and hydrocarbons over a standard commercial low light-off catalyst containing Pd on alumina/ceria/zirconia particles, mixed with a HC trap, and show levels of pollutants remaining in the gas downstream of the catalyst.

Referring firstly to FIG. 1, a synthetic exhaust gas composed of

| 400 ppm | $C_3H_6$ | |
| 80 ppm | $C_7H_8$ | (toluene) |
| 500 ppm | NO | |
| 5000 ppm | CO | |
| 8000 ppm | $O_2$ | |
| 10% | $H_2O$ | |
| balance argon | | | is passed over a powder sample of catalyst A, (10% Pd on alumina/ceria/zirconia), at a space velocity equivalent to 30,000hr$^{-1}$ through a catalyst-coated monolith. The gas inlet temperature was increased at a ramp rate of 100° C./minute, from 40° C. to 300° C. The product gas was analysed with respect to time, for CO, $C_3H_6$ and $C_7H_8$ and the results plotted on FIG. 1.

TEST 2

Figure 2:
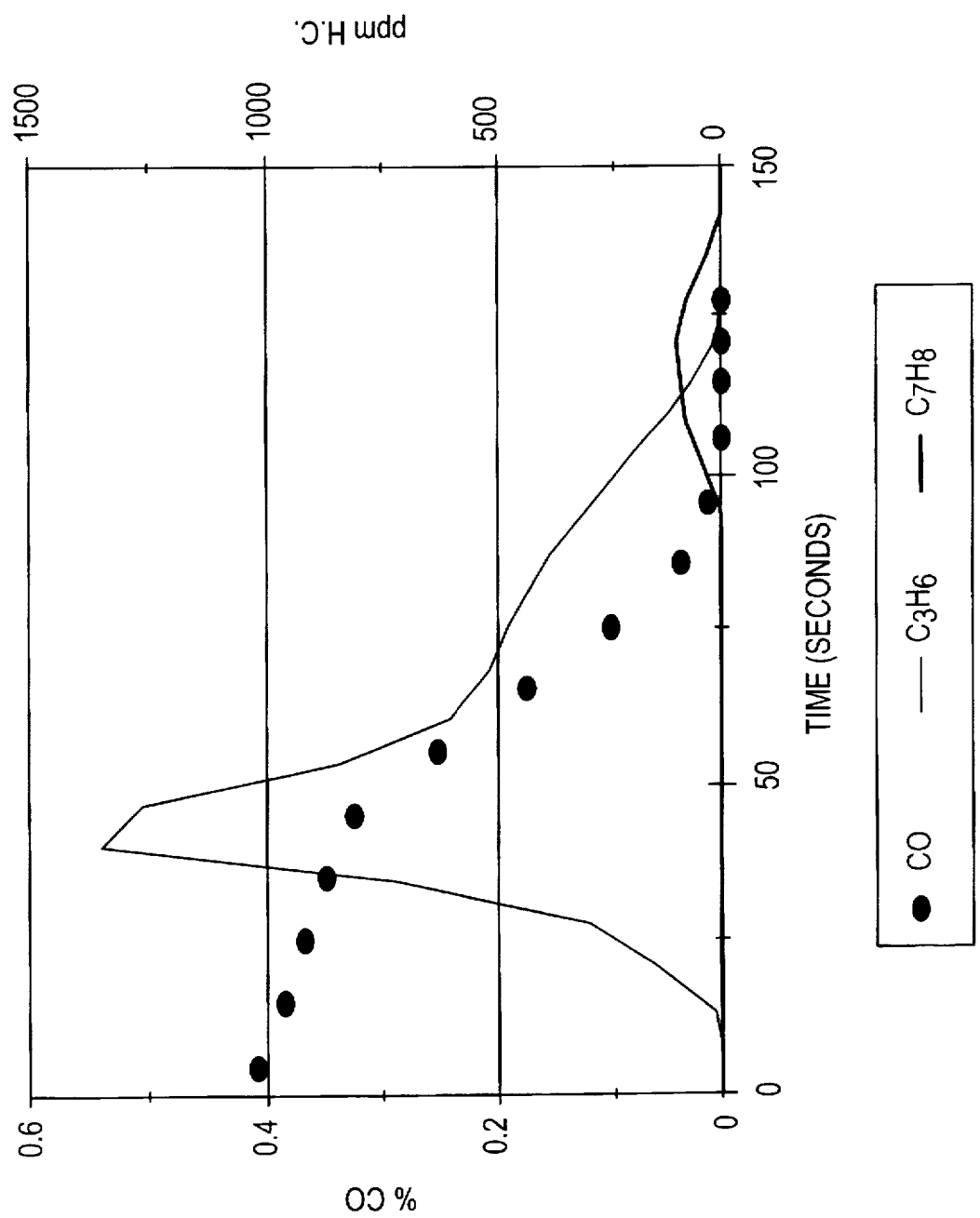

Referring now to FIG. 2, the same arrangement and general test conditions were used with a physical mixture of 2 parts of 2% Co/ZSM-5 prepared by ion-exchange, and 1 part of catalyst A in the reactor. It can be seen that CO conversion is very similar to that of Test 1, but that, especially in the first 25 seconds, quantities of the hydrocarbons $C_3H_6$ are very much lower than in FIG. 1 due to trapping in the Co/ZSM-5 zeolite. $C_3H_6$ is released as temperature is increased, but $C_7H_8$ either remains trapped or is catalytically converted until there is a small amount detected after 100 seconds. Clearly, a hydrocarbon trap is effective.

TEST 3

Figure 3:
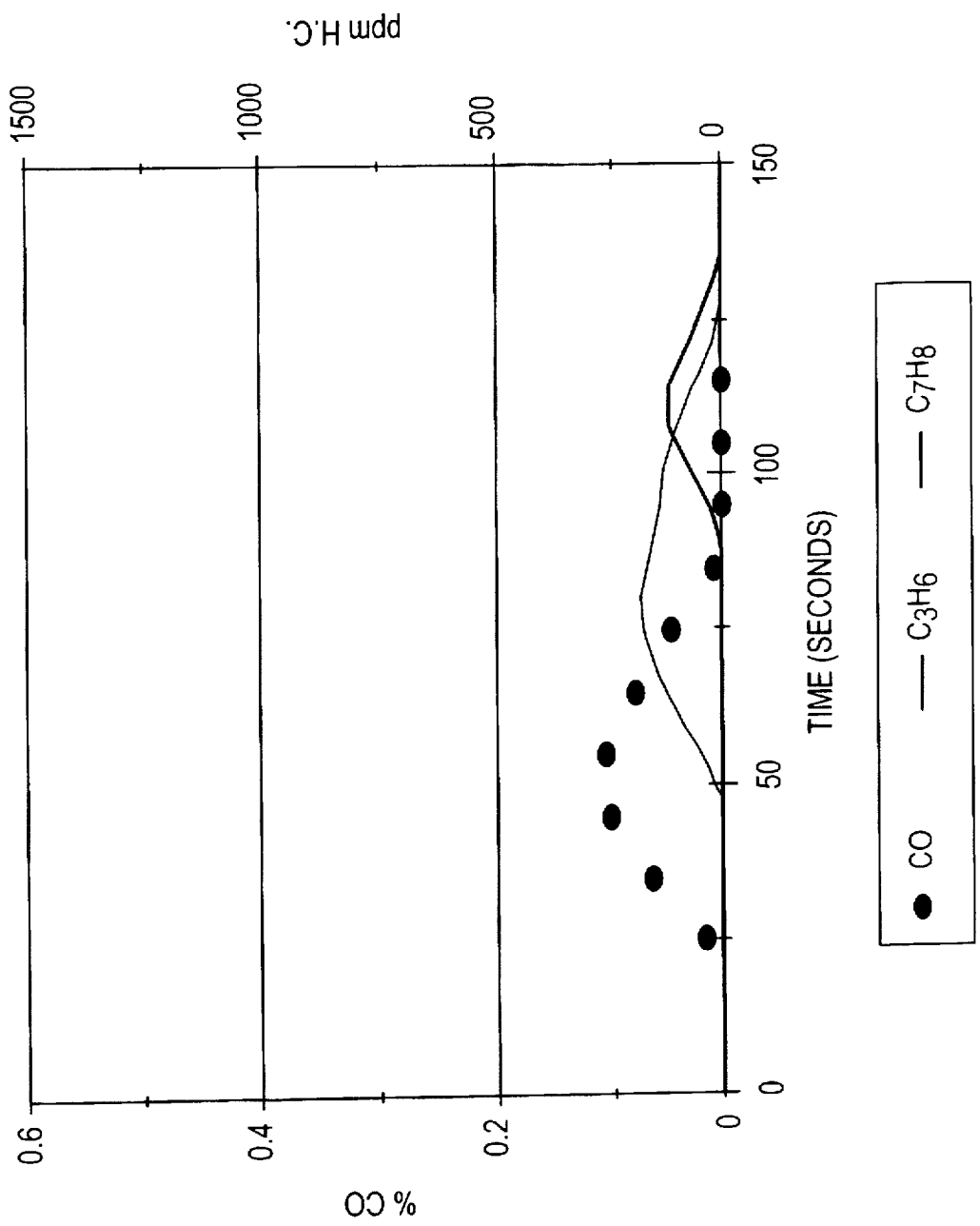

The same general test conditions and same catalyst/trap mix as in Test 2 is used, but the catalyst/trap system has been pre-dried by heating to 450° C. and flushing with air for 5 minutes, then cooled to 40° C. prior to the start of the run. The results are shown in FIG. 3.

It can readily be seen, in comparison to FIGS. 1 and 2, that there is a dramatic reduction in the pollutant gases, especially during the early part of the test, and the total quantity of $C_3H_6$ is reduced.

TEST 4

Figure 4:
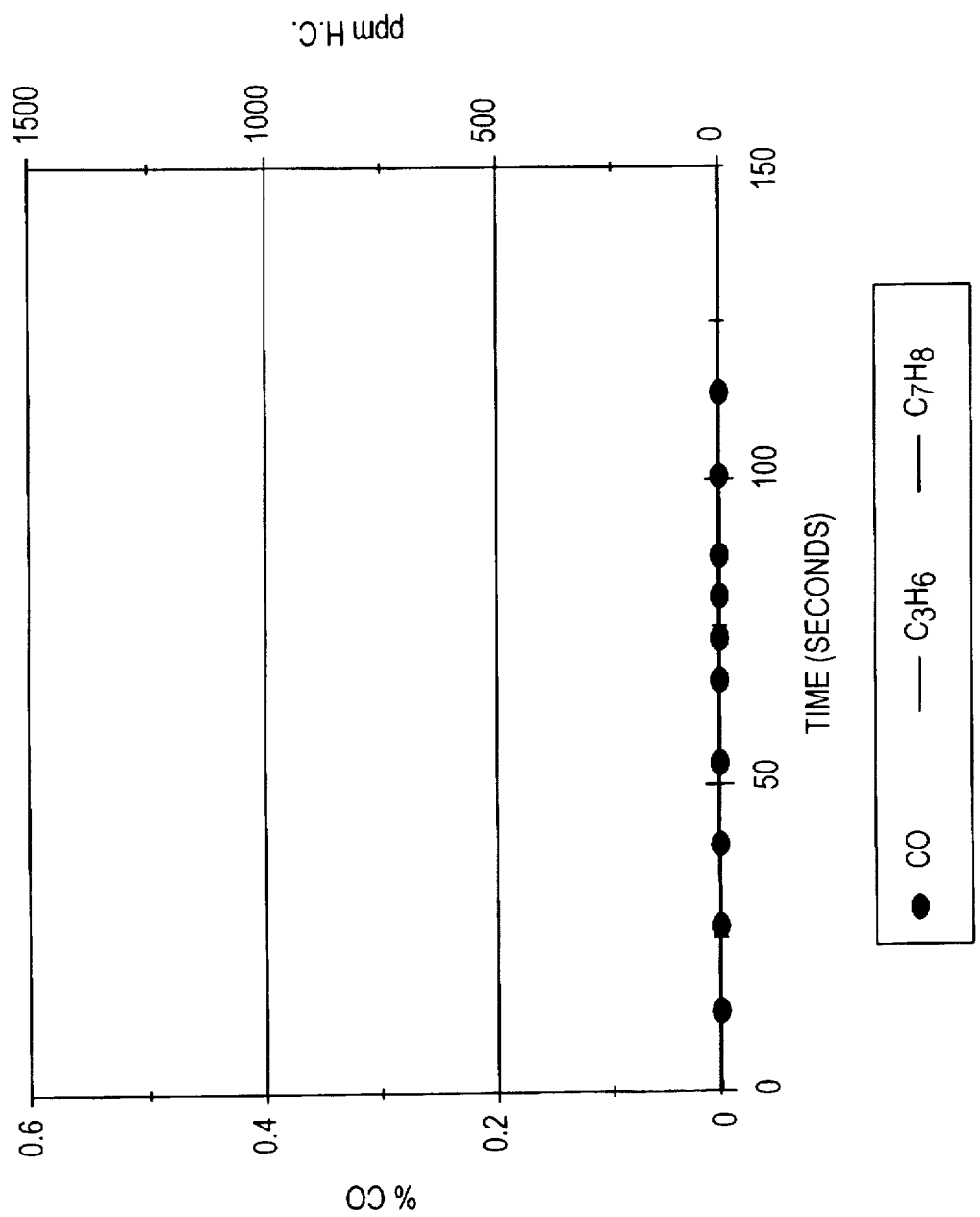

The same general test conditions and catalyst/trap mix as in Tests 2 and 3 are used, but the catalyst/trap mix was pre-dried and there is 0% $H_2O$ in the gas. FIG. 4 demonstrates dramatically that removing $H_2O$ could essentially eliminate the emissions of the studied pollutants from the catalyst during start-up.

TEST 5

Figure 5:
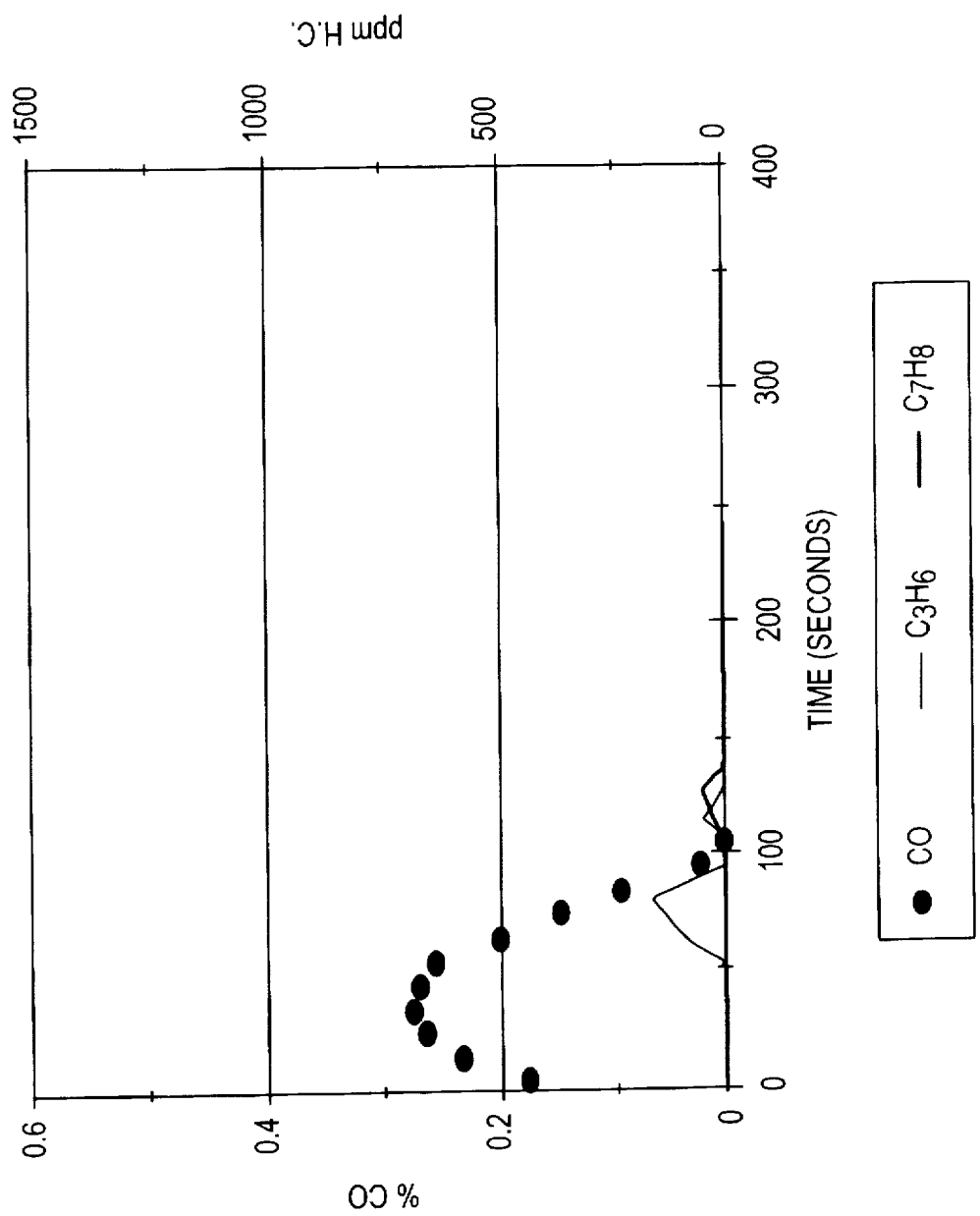

The same test conditions as in Test 4 are used, but instead of Co/ZSM-5 being a component of the trap/catalyst, the same quantity of silicalite is used. As in Test 4, the trap/catalyst was pre-dried. The results are plotted in FIG. 5, and it can be seen that silicalite is also effective in reducing start-up emissions, although less effective than Co/ZSM-5.

TEST 6

Figure 6:
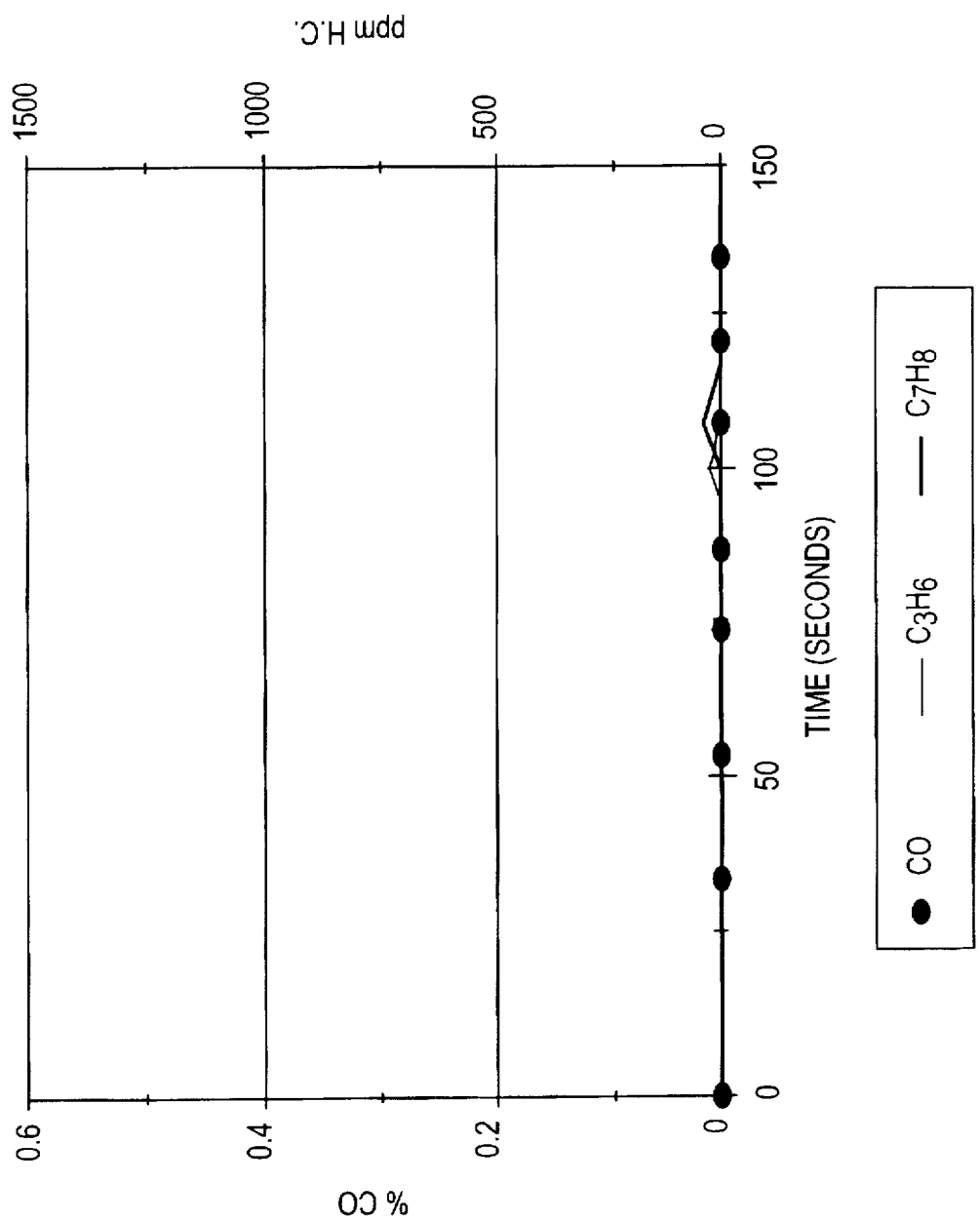
FIG. 6 is a similar plot, but when operating according to the present invention.
Figure 7:
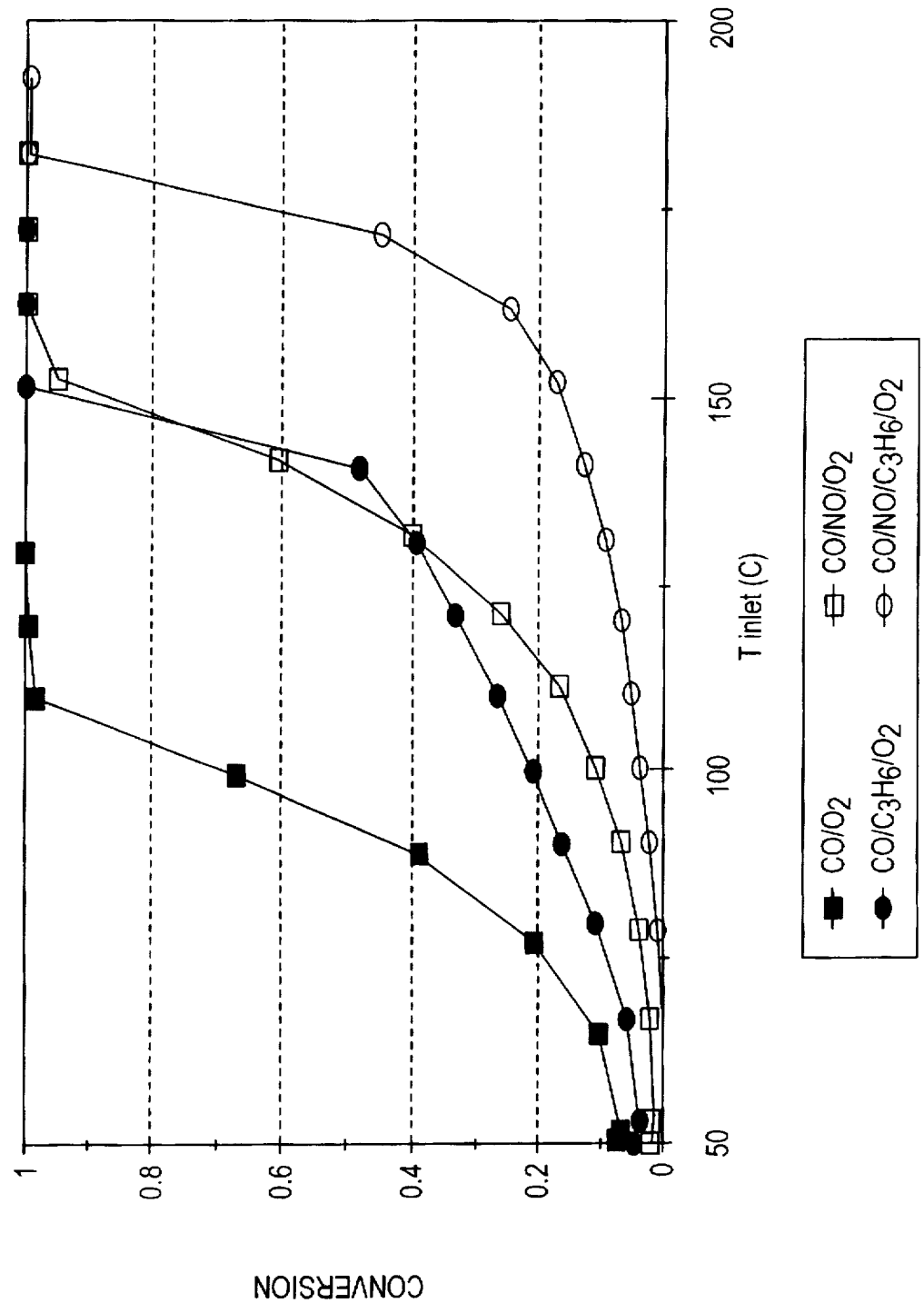
FIGS. 7 and 8 are plots showing the effect on CO conversion when a HC trap is used.

Reverting to the initial gas mixture (see Test 1), and using a water trap (zeolite 5A) upstream of the catalyst/HC trap (Co/ZSM-5). The weight ratio of water trap/hydrocarbon trap/catalyst is 4:2:1. The system was pre-dried as with Test 3. All other variables were unchanged from Test 3. The results shown in FIG. 6, compared with FIG. 3, shows virtually complete reduction in total quantities of the pollutants from a realistic synthetic exhaust gas mix.

TEST 7

A reactor was filled with particles of catalyst A and tested for CO conversion for a variety of feed compositions;
$CO/O_2$=5000/6000 (ppm), balance $N_2$
$CO/C_3H_6/O_2$=5000/300/6000 (ppm), balance $N_2$
$CO/NO/O_2$=5000/500/6000 (ppm), balance $N_2$
$CO/NO/C_3H_6/O_2$=5000/500/300/6000 (ppm), balance $N_2$.

The temperature was ramped at 5° C./min, and the space velocity was equivalent to 45,000hr$^{-1}$ over a catalyst-coated monolith. The results show that the $CO/O_2$ feed reaches 50% conversion (considered to be the "light-off" temperature) at approximately 92° C.; the $CO/NO/O_2$ feed reaches light-off at approximately 135° C.; the CO/C$_3$H$_6$/O$_2$ feed reaches light-off at approximately 139° C., and the CO/NO/C$_3$H$_6$/O$_2$ feed does not reach light-off until 171° C.

We have concluded from these results that CO light-off is inhibited by hydrocarbon (C$_3$H$_6$) and NO, and that removal of at least hydrocarbon from a gas stream will improve CO light-off. Preferably, of course, the emission control system would be arranged such that both NO and hydrocarbon species did not reach the catalyst during the CO light-off phase. The trapping of NO by a material within the system provides significant benefits during CO light off.

TEST 8

Figure 8:
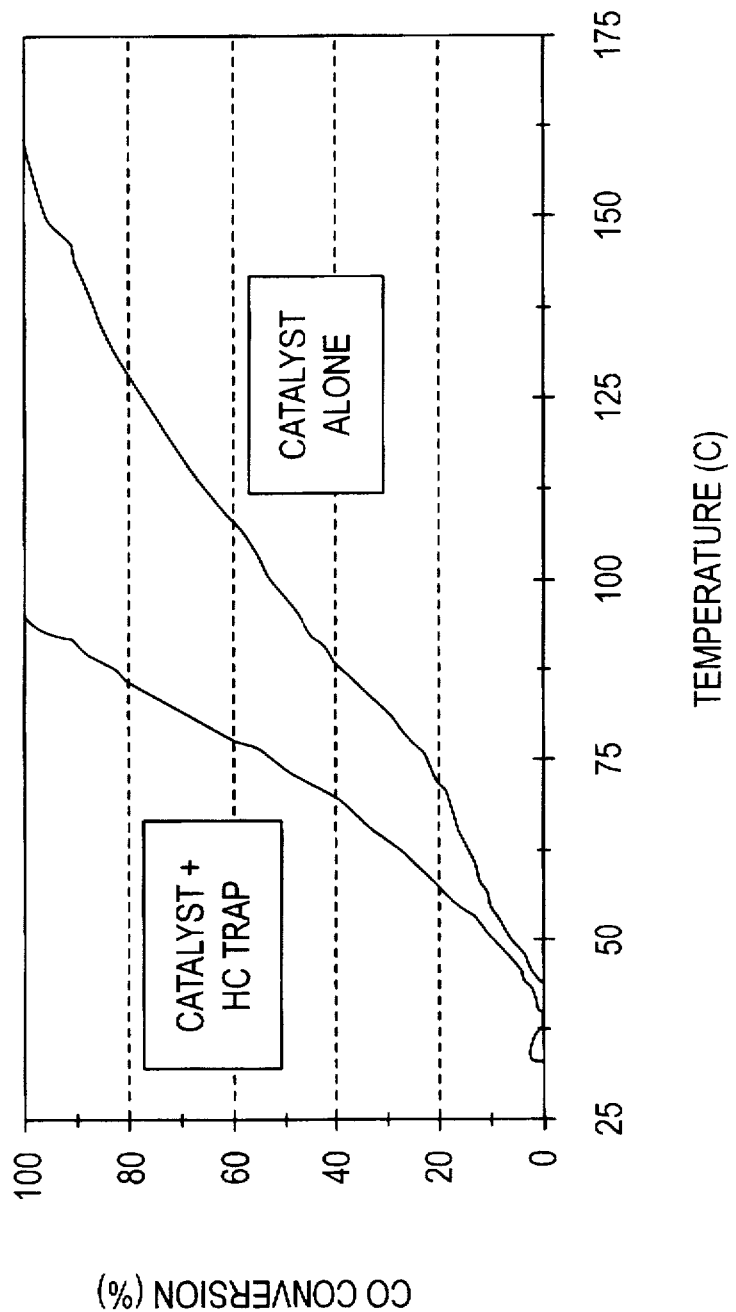

A bed of silicalite was incorporated upstream of a fully formulated commercial low light-off catalyst (weight ratio 4:1). The space velocity is equivalent to 25.000hr$^{-1}$ and the temperature ramp is approximately 40° C./min. The feed gas is 7000 ppm CO, 150 ppm C$_7$H$_8$, 10.000 ppm O$_2$, balance He. CO conversion was measured against temperature, and plotted in FIG. 8; for comparison, the identical test was performed without using silicalite, and it can be seen that removing hydrocarbons by a silicalite trap improves CO light-off and total CO conversion.

TEST 9

The reactor is packed with a zeolite 5A water trap, upstream of a silicalite/catalyst A mix in a weight ratio of 4:2:1 (zeolite:silicalite:catalyst), which is compared with a sample of catalyst A alone.

Samples of gas are passed through the reactor at a space velocity which is equivalent to a space velocity of 60.000hr$^{-1}$ through a catalyst-coated monolith. The system is pre-dried at 450° C. as described above. The reactor is heated at a ramp rate of 100° C./min from 40° C. to 300° C., whilst a gas mixture which is either "high" in CO content, or "low" in CO content is passed through for 150 seconds. The O$_2$ content of the gas was also adjusted to keep the overall air/fuel ratio approximately constant.

Gas compositions are shown in Table 1 below, and the total emission of CO and C$_3$H$_6$ for the first 150 seconds are shown in Table 2 below.

TABLE 1

| Gas Compositions | |
| --- | --- |
| Lower CO Concentration | Higher CO Concentration |
| 400 ppm C$_3$H$_6$ | 400 ppm C$_3$H$_6$ |
| 500 ppm NO | 500 ppm NO |
| 5000 ppm CO | 18400 ppm CO |
| 8000 ppm O$_2$ | 16700 ppm O$_2$ |
| 10% H$_2$O | 10% H$_2$O |
| balance Argon | balance Argon. |

TABLE 2

| CO and C$_3$H$_6$ emissions during test cycle (first 150 seconds) | | |
| --- | --- | --- |
| | CO (mg) | C$_3$H$_6$ (mg) |
| Blank (no catalyst) low CO feed | 8.7 | 1.04 |
| Catalyst only, low CO feed | 4.2 | 0.77 |
| H$_2$O trap/HC trap/Catalyst, low CO feed | 1.9 | 0.12 |
| H$_2$O trap/HC trap/catalyst, high CO feed | 0.40 | 0.0 |

We believe that the results shown in Table 2 demonstrate the effectiveness of increasing the CO exotherm by increasing the CO content in the system of the invention, and that this method, running generally counter to current emission control concepts, offers very substantial benefits. We believe that this is because the increased exotherm caused a rapid temperature rise of the catalyst to the catalyst light-off point. The system is therefore desirably optimised to provide that hydrocarbons are trapped until the catalyst has been heated by the CO exotherm, to the hydrocarbon light-off temperature.

Figure 9:
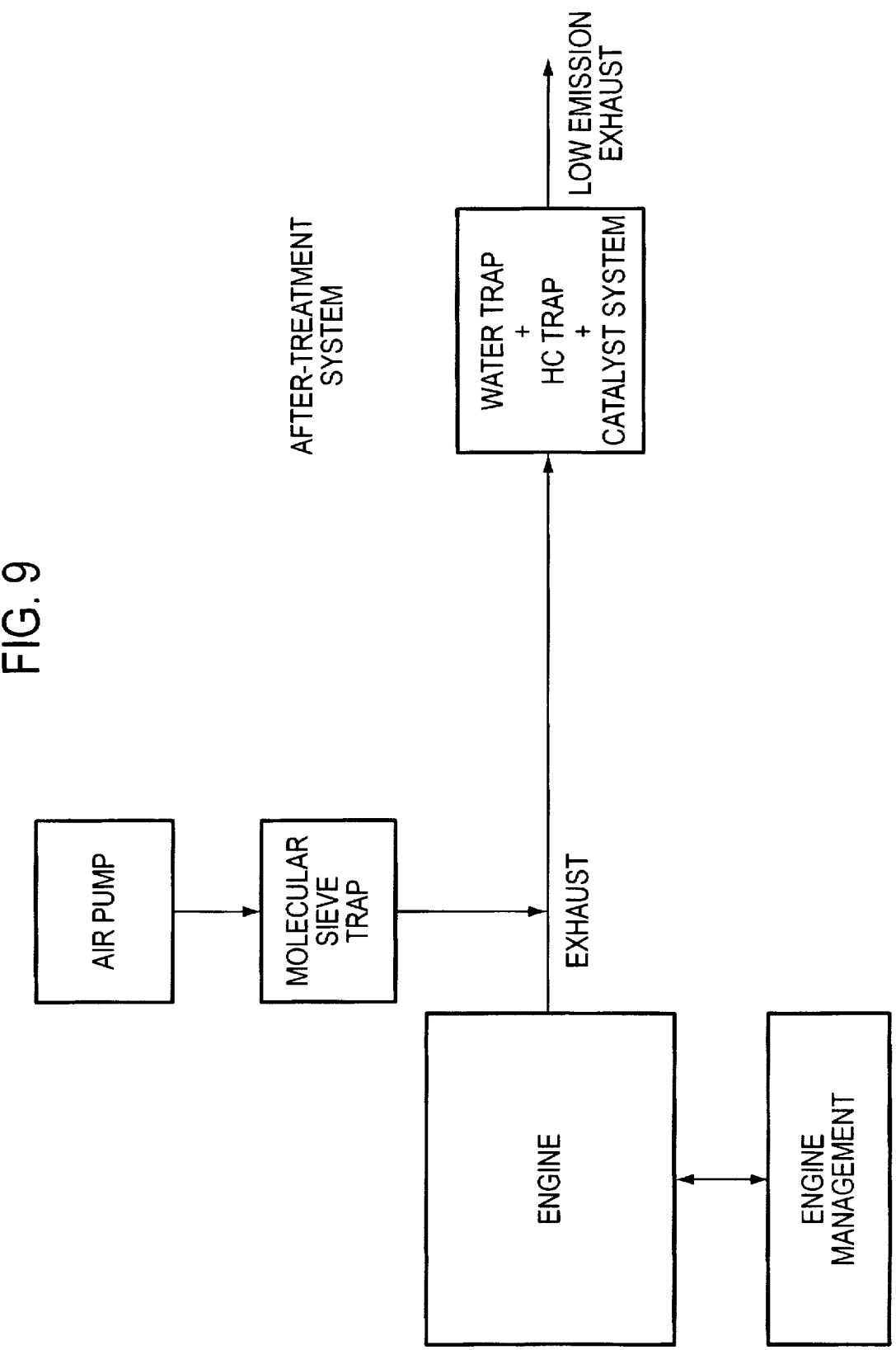
FIG. 9 is a schematic diagram of an emission control system according to one embodiment of the present invention.

One preferred embodiment of an emission control system according to the invention, is shown schematically in FIG. 9. The exhaust gases from the engine are passed to an exhaust after-treatment system comprising a water trap, a hydrocarbon trap and a catalyst system. Desirably the catalyst is a CO low light-off catalyst. In order to obtain maximum benefits, the after-treatment system is dried before each start-up. This may be accomplished by utilising an air pump taking ambient air and passing it through a second molecular sieve water trap (eg zeolite 5A) which is heated by residual engine heat, and which continues to operate after engine switch-off. The secondary molecular sieve is itself dried during normal engine operation by the combination of residual engine heat and a flow of air, and after engine switch-off the secondary molecular sieve and pump provides hot dried air to dry the after-treatment system.

TEST 10

The benefits of the invention have been demonstrated in engine tests, using a US Ford Contour, model year 1994 and with a 2 litre engine, in which the exhaust system incorporates two 42in$^3$ (688 cc) monoliths. The second (downstream) monolith had deposited thereon H-ZSM5 as a hydrocarbon absorber. In the initial tests, no water trap was deposited on the first monolith, but the bare monolith was retained in the system to keep the back-pressure and thermal mass constant. In the second series of tests, a zeolite 5A was deposited on the first monolith. The tests were run to assess the capability of the system to trap total hydrocarbons, and the car engine and exhaust system were operated in five FmP tests. No measurements were made during the first FTP tests, in order to "age" the system. After the first and second tests, the system was allowed to cool normally after engine switch-off, and the results for hydrocarbon trapped were measured for the second and third FTP tests, and averaged to give the results labelled "not pre-dried" in Table 3 below. After the third and fourth tests, nitrogen was flowed through the exhaust system to substantially eliminate moisture in the trapping system. The results from the fourth and fifth FTP tests, therefore, have been averaged and the results for hydrocarbon trapping are labelled "pre-dried" in Table 3.

TABLE 3

| Hydrocarbon Trapping (%) | | |
| --- | --- | --- |
| water trap/HC trap/pre-dried? | 0–20 seconds | 20–40 seconds |
| blank/yes/not pre-dried | 36.7 | 8.4 |
| blank/yes/pre-dried | 47.0 | 13.6 |
| yes/yes/not-pre-dried | 52.1 | 1.5 |
| yes/yes/pre-dried | 70.5 | 0.6 |

It is plain that pre-drying of the blank/HC trap system shows a clear advantage in HC trap performance, and trapping in both portions of the test were improved. In the case of the water trap/HC trap system, this shows an improvement in HC trapping efficiency even when not pre-dried, but pre-drying demonstrates a significant improvement. Further studies and theoretical calculations indicate that the 70.5% trapping in the first 20 seconds probably represent trapping of all HC's larger than C2.

The above Tests describe various aspects of the present invention, but these may be changed in detail without departing from the overall inventive concept.

We claim:

1. An emission control system for an internal combustion engine for a vehicle, comprising an emission control catalyst, a trap for trapping hydrocarbons (HC) positioned upstream of the emission control catalyst, and means for pre-drying the trap and/or the catalyst wherein said emission control system is on-board the vehicle and said pre-drying means is operative after engine switch-off or before engine start-up and is effective to reduce moisture in said trap and/or emission control catalyst prior to each engine start-up.

2. A system as claimed in claim 1, wherein the means for pre-drying comprises means for supplying a stream of heated air through the trap and/or the catalyst.

3. A system as claimed in claim 2, wherein the pre-drying means operates after engine switch-off.

4. A system as claimed in claim 1, comprising a first water trap positioned upstream of the HC trap.

5. A system as claimed in claim 4, comprising a second a water trap positioned downstream of the catalyst.

6. A system as claimed in claim 1, wherein the catalyst comprises a low light-off temperature CO oxidation catalyst.

7. A system as claimed in claim 6, wherein the CO oxidation catalyst is coated with a porous material that permits CO and oxygen to reach the catalyst surface, but prevents HC from reaching the catalyst surface.

8. A system as claimed in claim 2, comprising a first water trap position upstream of the HC trap.

9. A system as claimed in claim 8 wherein a second water trap is positioned between the means for supplying the stream of heated air and the HC trap and/or emission control catalyst.

10. A system for an internal combustion engine as claimed in claim 4, wherein the emission control catalyst comprises a low temperature light-off HC oxidation catalyst.

11. A system as claimed in claim 6, wherein said hydrocarbon trap further comprises materials which trap or delay NO.

12. A system as claimed in claim 6, wherein said engine further comprises engine management means to maximize the CO content of exhaust gas during cold start.

13. A system as claimed in claim 10, wherein the emission control catalyst comprises both a low light-off temperature CO oxidation catalyst and said low temperature light-off HC oxidation catalyst.

14. A system as claimed in claim 4, wherein the means for pre-drying comprises a means for pre-drying the first water trap.

15. A system as claimed in claim 14, wherein a second water trap is positioned between the means for pre-drying and the first water trap.

16. An emission control system for an internal combustion engine for a vehicle, comprising an emission control catalyst, a trap for trapping hydrocarbons (HC) positioned upstream of the emission control catalyst, and means for pre-drying the trap and/or the emission control catalyst wherein said emission control system is on-board the vehicle and said pre-drying means is operative after engine switch-off or before engine start-up and is effective to reduce moisture in said trap and/or emission control catalyst prior to each engine start-up and wherein said emission control catalyst comprises a low temperature light-off CO oxidation catalyst and a low temperature light-off HC oxidation catalyst wherein the low temperature light-off CO oxidation catalyst generates heat sufficient to increase a temperature of the low temperature light-off HC oxidation catalyst.

17. An emission control system according to claim 16, wherein said means for pre-drying the trap and/or emission control catalyst utilizes residual heat from the engine or the emission control catalyst.

18. An emission control system according to claim 16, wherein said means for pre-drying the trap and/or emission control catalyst is electrically heated air.

* * * * *